United States Patent
Gao et al.

(10) Patent No.: US 8,219,549 B2
(45) Date of Patent: Jul. 10, 2012

(54) FORUM MINING FOR SUSPICIOUS LINK SPAM SITES DETECTION

(75) Inventors: Bin Gao, Beijing (CN); Tie-Yan Liu, Beijing (CN); Hang Li, Beijing (CN); Congkai Sun, Shanghai (CN)

(73) Assignee: Microsoft Corporation, Redmond, WA (US)

( * ) Notice: Subject to any disclaimer, the term of this patent is extended or adjusted under 35 U.S.C. 154(b) by 613 days.

(21) Appl. No.: 12/027,259

(22) Filed: Feb. 6, 2008

(65) Prior Publication Data
US 2009/0198673 A1 Aug. 6, 2009

(51) Int. Cl.
*G06F 7/00* (2006.01)

(52) U.S. Cl. ........ 707/726; 707/735; 707/748; 707/755; 707/780; 709/201; 709/205; 709/206; 709/218

(58) Field of Classification Search ............. 707/999.05, 707/726, 735, 748, 755, 780; 709/201, 205, 709/206, 217, 218
See application file for complete search history.

(56) References Cited

U.S. PATENT DOCUMENTS

| | | | |
|---|---|---|---|
| 7,194,516 B2 * | 3/2007 | Giacobbe et al. | 707/999.003 |
| 7,466,663 B2 * | 12/2008 | Young et al. | 370/254 |
| 7,509,344 B1 * | 3/2009 | Kamvar et al. | 707/999.104 |
| 7,797,197 B2 * | 9/2010 | Kumar et al. | 705/26.1 |
| 7,974,998 B1 * | 7/2011 | Chang | 709/201 |
| 2003/0195884 A1 * | 10/2003 | Boyd et al. | 707/7 |
| 2006/0004748 A1 * | 1/2006 | Ramarathnam et al. | 707/6 |
| 2006/0036598 A1 | 2/2006 | Wu | |
| 2006/0069667 A1 | 3/2006 | Manasse et al. | |
| 2006/0095416 A1 | 5/2006 | Barkhin et al. | |
| 2006/0184500 A1 | 8/2006 | Najork et al. | |
| 2006/0248072 A1 | 11/2006 | Brewer et al. | |
| 2006/0253458 A1 * | 11/2006 | Dixon et al. | 707/10 |
| 2007/0033189 A1 * | 2/2007 | Levy et al. | 707/7 |
| 2007/0100875 A1 | 5/2007 | Chi et al. | |
| 2007/0208703 A1 * | 9/2007 | Shi et al. | 707/3 |
| 2008/0082481 A1 * | 4/2008 | Joshi et al. | 707/2 |
| 2008/0114755 A1 * | 5/2008 | Wolters et al. | 707/5 |

FOREIGN PATENT DOCUMENTS

WO WO2006036170 A1 4/2006

OTHER PUBLICATIONS

Becchetti, et al., "Link Analysis for Web Spam Detection," at <<http://www.dcc.uchile.cl/~ccastill/papers/becchetti_2007_link_analysis_web_spam_detection.pdf, Universita di Roma & Yahoo! Research, Barcelona, Mar. 22, 2007, pp. 1-41.

(Continued)

*Primary Examiner* — Hosain Alam
*Assistant Examiner* — Jieyang Tang
(74) *Attorney, Agent, or Firm* — Lee & Hayes, PLLC

(57) ABSTRACT

An anti-spam technique for protecting search engine ranking is based on mining search engine optimization (SEO) forums. The anti-spam technique collects webpages such as SEO forum posts from a list of suspect spam websites, and extracts suspicious link exchange URLs and corresponding link formation from the collected webpages. A search engine ranking penalty is then applied to the suspicious link exchange URLs. The penalty is at least partially determined by the link information associated with the respective suspicious link exchange URL. To detect more suspicious link exchange URLs, the technique may propagate one or more levels from a seed set of suspicious link exchange URLs generated by mining SEO forums.

20 Claims, 6 Drawing Sheets

OTHER PUBLICATIONS

Benczur et al, "SpamRank Fully Automatic Link Spam Detection Work in Progress," 14th International World Wide Web Conference (WWW2005), Japan, May 10-14, 2005, pp. 1-14.

Carvalho et al, "Site Level Noise Removal for Search Engines," 15th International World Wide Web Conference (WWW2006), Scotland, May 23-26, 2006, pp. 73-82.

Fetterly, et al., "Spam, Damn Spam, and Statistics Using statistical analysis to locate spam web pages", at <<http://citeseer.ist.psu.edu/cache/papers/cs/33694/http:zSzzSzwebdb2004.cs.columbia.eduzSzpaperszSz1-1.pdf/fetterly04spam.pdf>>, Seventh International Workshop on the Web and Databases, Jun. 17-18, 2004, Paris, France, 6 pgs.

Gyongyi et al, "Combating Web Spam with TrustRank," In Proceedings of the Thirtieth International Conference on Very Large Data Bases, 2004, pp. 576-587.

Gyongyi et al, "Link Spam Alliances," Technical Report, Stanford University, Mar. 2, 2005, pp. 1-22.

Gyongyi et al, "Link Spam Detection Based on Mass Estimation," VLDB, Sep. 12-15, 2006 Korea, 12 pgs.

Gyongyi et al, "Web Spam Taxonomy," AIRWEB, 2005, pp. 1-9.

Han, et al., "A Technique for Detecting Web Spam from a Densely Connected Directed Graph of Sites", available at least as early as Sep. 4, 2007, at http://www.ieice.org/iss/de/DEWS/DEWS2007/pdf/a1-8.pdf, DEWS2007 1A-8, 6 pgs.

Page et al, "The PageRank Citation Ranking: Bringing Order to the Web," Technical Report, Stanford University, Stanford, CA, Jan. 29, 1998, pp. 1-17.

Sobek, "BadRank as the Opposite of PageRank," available as early as Jul. 8, 2007, retrieved on Apr. 7, 2008 at <<http://en.pr10.info/pagerank0-badrank/>>, pr10.info, 5 pgs.

Wu, et al., "Identifying Link Farm Spam Pages", at <<http://www.cse.lehigh.edu/~brian/pubs/2005/www/link-farm-spam.pdf, International World Wide Web Conference Committee, 2005, Japan, 10 pgs.

* cited by examiner

FORUM MINING FOR SUSPICIOUS LINK SPAM SITES DETECTION

BACKGROUND

As more and more people rely on the wealth of online information, increased exposure on the Web may yield significant financial gains for individuals or organizations. Most frequently, search engines are the entryways to the Web. Often, when a user searches the web using a search engine, only top-ranked pages receive the attention of the user. In general, the higher the ranking is, the greater is the chance to receive the attention of the user. While search engine ranking aims to provide the most relevant information to users, owners of webpages all desire a higher ranking by the search engine in order to gain an advantage over others. For this reason, some people try to mislead search engines, so that their pages would rank artificially high in search results, and thus, capture undeserved user attention. Web spamming refers to such actions intended to mislead search engines into ranking some webpages higher than they deserved.

Web spamming is the major problem for search engines. Web spamming can significantly deteriorate the quality of search engine results. It is also a cause of big costs for search engines to crawl, index, and store the spam pages. Web spamming is also a serious problem for Web users because the users are not aware of the spamming practice and tend to trust the result of a search based on a general reputation of the search engine used.

There is a variety of Web spamming techniques, all specifically targeting search engine ranking techniques. One practice is to introduce artificial text into webpages, and another is to introduce page links, to affect the result of searches. The latter is called link spamming, which is one of the popular web spam techniques, as further discussed below.

Web spamming techniques have also evolved in time. The first generation spam involved keyword stuffing when ranking was dependent on document similarity. The second generation spam involved link farms when ranking was largely dependent on site popularity. The third generation spam uses mutual link exchange through "mutual admiration societies" when ranking is largely dependent on page reputation. In general, the third-generation Web spamming is harder to detect than the previous generations.

Link spamming techniques, which include busying/selling links, exchanging links, and constructing link farms, are a major category of the commonly used spam techniques. Link spamming refers to the cases where spammers set up structures of interconnected pages in order to boost their rankings in link structure-based ranking system such as PageRank. Since link analysis is a crucial factor for commercial search engines, link spam is among the most popular and harmful techniques for search engines nowadays.

Many anti-link spam methods, such as TrustRank, BadRank, and SpamRank, have been proposed to tackle the problem. Certain methods of automatically finding and then penalizing the link spamming have been introduced. Automatic detection is important because while human experts may be able to identify spam, it is too expensive to manually evaluate a large number of pages.

For example, TrustRank is a link analysis technique used for semi-automatically separating useful webpages from spam. TrustRank combats web spam by propagating trust among web pages. The method selects a small set of seed pages to be evaluated by an expert. Once the reputable seed pages are manually identified, a crawl extending outward from the seed set seeks out similarly reliable and trustworthy pages. TrustRank's reliability diminishes as documents become further removed from the seed set. This type of propagation may be suited for propagating authority, but it is not optimal for calculating trust scores for demoting spam sites.

In comparison, BadRank is an anti-spamming technique which downgrades pages that are found within a linking network that fits the characteristics of a spam. BadRank has been used by search engines against link farms. BadRank is practically an inverse PageRank, in which a page will get a high score if it points to many pages with a high BadRank score. SpamRank thus resembles an "opposite TrustRank". One advantage of SpamRank over TrustRank is that good pages cannot be marked as spam.

Furthermore, the concept of spam mass, a measure of the impact of link spamming on a page's ranking, has also been introduced. There have been discussions of how to estimate spam mass and how the estimates can help identifying pages that benefit significantly from link spamming. Other proposed techniques targeted a different type of noisy link structures, residing at site level. These techniques investigated and tried to eliminate or frustrate site level mutual reinforcement relationships, abnormal support coming from one site towards another, and complex alliances between web sites.

All above methods are based on heuristics or statistical properties, and they cannot effectively resist spam in certain situations. With the existing anti-spamming techniques, link spam problem has yet to be solved. Given the importance of search engine anti-spamming, it is desirable to develop new anti-spamming techniques to protect the integrity of search engine ranking.

SUMMARY

In this disclosure, an anti-spam technique for protecting search engine ranking is disclosed. The anti-spam technique is based on mining search engine optimization (SEO) forums. The technique indirectly detects suspicious spam sites through mining SEO forums, rather than relying on visiting the spam sites themselves and analyzing the content of the spam sites. The anti-spam technique collects webpages such as SEO forum posts from a list of suspect spam websites, and extracts suspicious link exchange URLs and corresponding link information from the collected webpages. A search engine ranking penalty is then applied to the suspicious link exchange URLs. The penalty is at least partially determined by the link information associated with the respective suspicious link exchange URL.

In one embodiment, the anti-spam technique has two stages. In the first stage, a seed set of suspicious link exchange URLs are generated by mining SEO forums. In the second stage, the seed set of suspicious link exchange URLs are propagated one or more levels in order to detect more suspicious link exchange URLs. The propagation helps to detect hidden spammers. The technique can detect link spam sites which may not be detected by existing anti-spam methods.

A spam activity score may be calculated for each detected suspicious link exchange URL according to the spam activity of the URL. For example the spam activity score may be calculated by weighted linear combination of multiple factors such as the number of posts of the user posts the URL, the post time sequence of user who posted the URL, etc.

This Summary is provided to introduce a selection of concepts in a simplified form that are further described below in the Detailed Description. This Summary is not intended to identify key features of the claimed subject matter, nor is it intended to be used as an aid in determining the scope of the claimed subject matter.

BRIEF DESCRIPTION OF THE FIGURES

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Overall Scheme

A system is provided for automatically identifying a large quantity of suspicious link spam sites based on a selected list of search engine optimization (SEO) forums. The SEO forums may be manually selected. Through mining thread context in these selected SEO forums, the sites whose URLs are posted for link spam purposes can be detected. More suspicious URLs may be detected by propagating a seed set of the URLs that are suspicious of doing link-exchanges. A link graph is then constructed. After further processing the link graph and the other information collected from the forums, a list of suspicious link spam sites is generated along with their activity scores. The search engines can thus punish the listed suspicious link spam sites to protect the integrity of search engine ranking and improve the search results.

Figure 1:
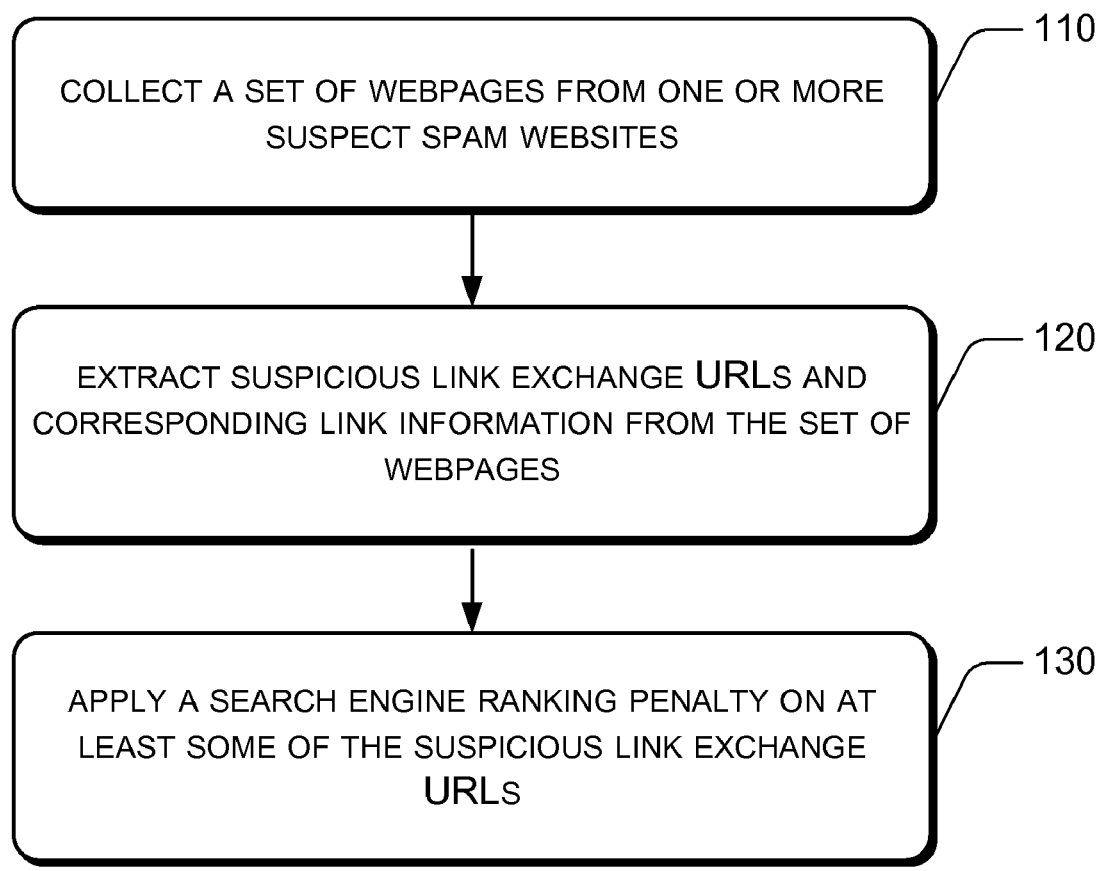
FIG. 1 is a flowchart showing the general aspects of an exemplary anti-spamming process in accordance with the present disclosure.

FIG. 1 is a flowchart showing the general aspects of an exemplary anti-spamming process in accordance with the present disclosure. The order in which the process is described is not intended to be construed as a limitation, and any number of the described method blocks may be combined in any order to implement the method, or an alternate method. The anti-spamming process is used for protecting search engine ranking based on mining search engine optimization (SEO) forums.

At block 110, the system collects a set of webpages from one or more suspect spam websites. One type of prime suspect spam websites are those contain search engine optimization (SEO) forums on which uses post requests, replies, suggestions and recommendations for making links between two different webpages. Suspect spam websites containing such SEO forums may be pre-identified and manually selected. From the SEO forums, webpages such as threads of user posts containing spam link information may be identified and retrieved (e.g., downloaded) for further analysis. An effective way to collect webpages (e.g., to retrieve user posts) is to crawl the SEO forums using a web crawler. A web crawler (also known as a web spider or web robot) is a program or automated script which browses the World Wide Web in a methodical, automated manner. Although web crawlers are primarily used by search engines to provide up-to-date data, they can also be used to gather specific types of information from webpages, such as harvesting content information on the webpages, as is the case in the context of the process shown in FIG. 1.

At block 120, the system extracts suspicious link exchange URLs and corresponding link information from the collected webpages such as threads of user posts. One way to extract suspicious link exchange URLs and corresponding link information is to use a webpage parser, such as an HTML parser having a Java library used to parse HTML in either a linear or nested fashion. Although a webpage parser may be used for extracting various types of information, for the present purpose it is primarily used for extracting link information.

As will be illustrated in a later section of the present description, the extracted suspicious link exchange URLs may be classified into multiple classes based on analyzing content of the webpages (e.g. a user post) from which each suspicious link exchange URL is extracted. The content of the webpage may be analyzed by detecting keywords or language patterns indicating link exchange, links sale and recommendation exchange.

In some embodiments, the system applies a predetermined filter to the extracted suspicious link exchange URLs to clear some of the extracted suspicious link exchange URLs. For example, the predetermined filter may include a white list.

The suspicious link exchange URLs may be extracted by first extracting a seed set of suspicious link exchange URLs, and propagating from the seed set of suspicious link exchange URLs to detect and collect additional suspicious link exchange URLs. The propagation can go multiple levels.

In order to analyze the extracted information, the system may construct a link graph of the suspicious link exchange URLs using the extracted link information, and detect link exchanges by analyzing the link graph's structure. The link exchanges may include both explicit spammers and hidden spammers. The link exchanges may be bi-direction link exchanges or three-way link exchanges.

In one embodiment, each suspicious link exchange URL is evaluated by a spam activity score which is calculated by a weighted linear combination of multiple activity factors, as illustrated in a later section of the present description. The search engine penalty may be applied to suspicious link exchange URLs that have a high spam activity score.

Figure 2:
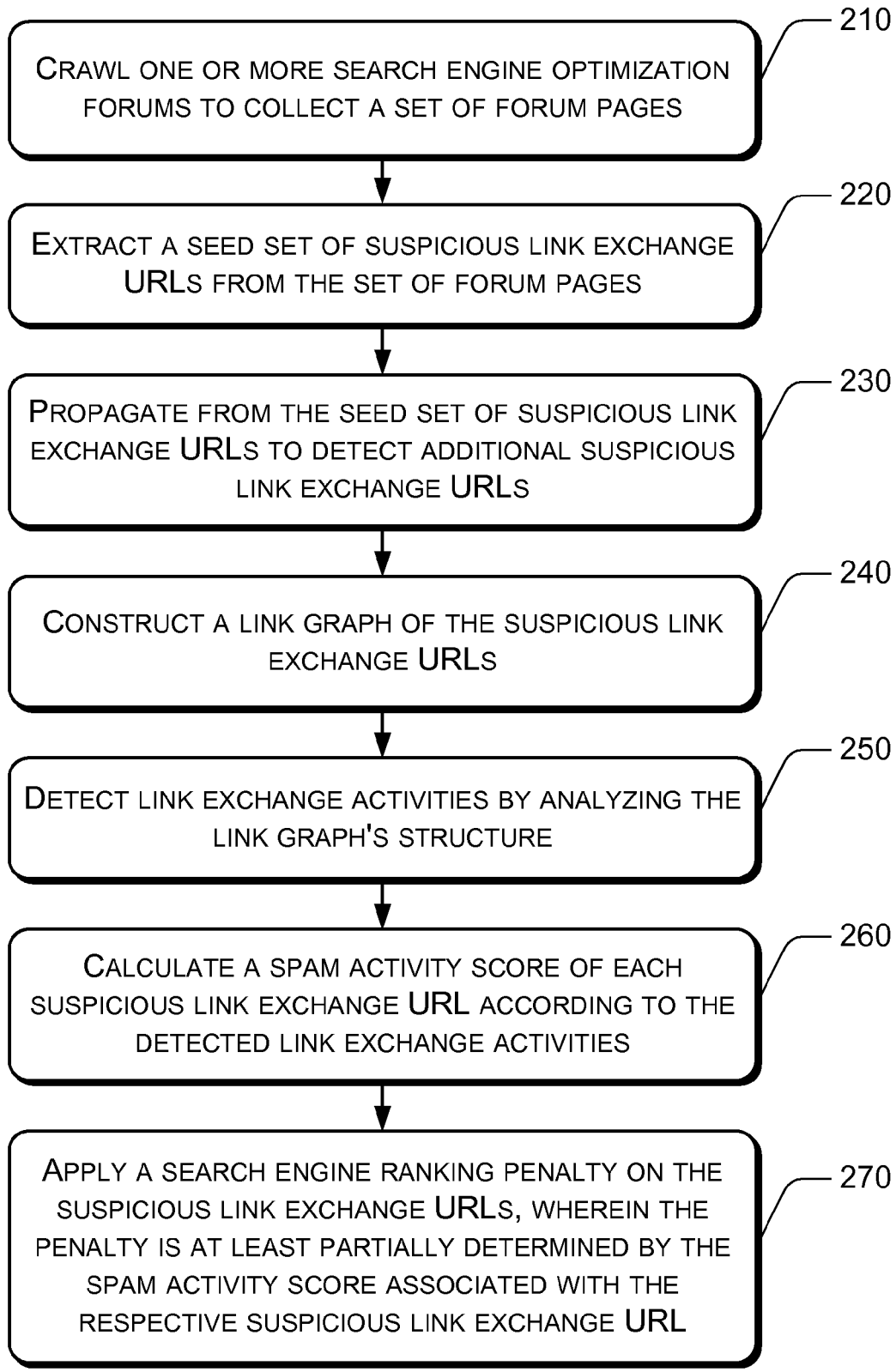
FIG. 2 is a flowchart of an exemplary embodiment of the anti-spamming process in accordance with the present disclosure.

FIG. 2 is a flowchart of an exemplary embodiment of the anti-spamming process in accordance with the present disclosure.

At block 210, the system crawls one or more search engine optimization (SEO) forums to collect a set of forum pages. The SEO forums may be pre-identified and manually selected.

At block 220, the system extracts a seed set of suspicious link exchange URLs from the set of forum pages.

At block 230, the system propagates from the seed set of suspicious link exchange URLs to detect additional suspicious link exchange URLs.

At block 240, the system constructs a link graph of the suspicious link exchange URLs.

At block 250, the system detects link exchange activities by analyzing the structure of the link graph. Both explicit spammers and hidden spammers may be detected.

At block 260, the system calculates a spam activity score of each suspicious link exchange URL according to the detected link exchange activities.

At block 270, the system applies a search engine ranking penalty on at least some of the suspicious link exchange URLs. The penalty is at least partially determined by the spam activity score associated with the respective suspicious link exchange URL. The spam activity score may be calculated by a weighted linear combination of multiple activity factors, as will be further described herein. Preferably, a search engine ranking penalty is applied to those suspicious link exchange URLs that have a spam activity score higher than a preset threshold value. Further, the amount penalty applied on each suspicious link exchange URL may also be determined at least partially by the spam activity score of the respective suspicious link exchange URL.

Further detail of exemplary embodiments of the above described anti-spam technique is described as follows.

Mining SEO Forums to Detect Suspicious Spam Sites

One feature of the presently described anti-spam technique for protecting search engine ranking is to detect suspicious spam sites indirectly through mining SEO forums, rather than relying on visiting the spam sites themselves and analyzing the content of the spam sites. The present anti-spam technique may, but does not have to, be further combined with other techniques that utilizes the information collected from the spam sites themselves.

It is observed that a spam site is difficult to be identified with link structure information only. For example, most link-sale sites are not very different from normal sites. The link-sale sites may point several out-going links to their customers. But there is nothing unusual about this because a normal site may also do the same. The customer sites of the link-sale sites may also look normal too. Under some circumstances, even human labelers may have difficulty in judging whether these links are malicious or for a legitimate recommendation purpose.

To conveniently and efficiently exchange link trade information, spammers usually log onto SEO forums to communicate with each other for trading links, including link exchange, link sale, and recommendation link exchange. These forums are increasingly more popular. Spammers post requests for "link exchange", "buy & sell link", and "recommendation exchange" in these forums, along with the URLs of their websites, and other interested spammers may reply the requests and provide the URLs of their websites. In recognition of these activities, instead of searching and analyzing these spamming websites themselves, the technique described herein identifies the URLs of them by analyzing the context in the posts by spammers on the SEO forums.

There are also many "hidden" spammers in these forums. These hidden spammers may behave very cautiously and artfully and do not explicitly post URLs of their own sites. Instead, they may do link-exchanges with the sites whose URLs are explicitly posted by other spammers, all without explicitly posting their own URLs on an SEO forums. In order to detect these hidden spammers, the seed set of suspicious link-exchange URLs initially identified may be propagated by further following (e.g., by a crawler) the links found therein. The propagation may go several levels, for example three levels. The results of the propagation, together with the seed set of suspicious link exchange URLs, may be used to construct a link graph. The spamming websites of hidden spammers and the three-way link-exchanging websites can both be detected by analyzing the structure of the above link graph.

Figure 3:
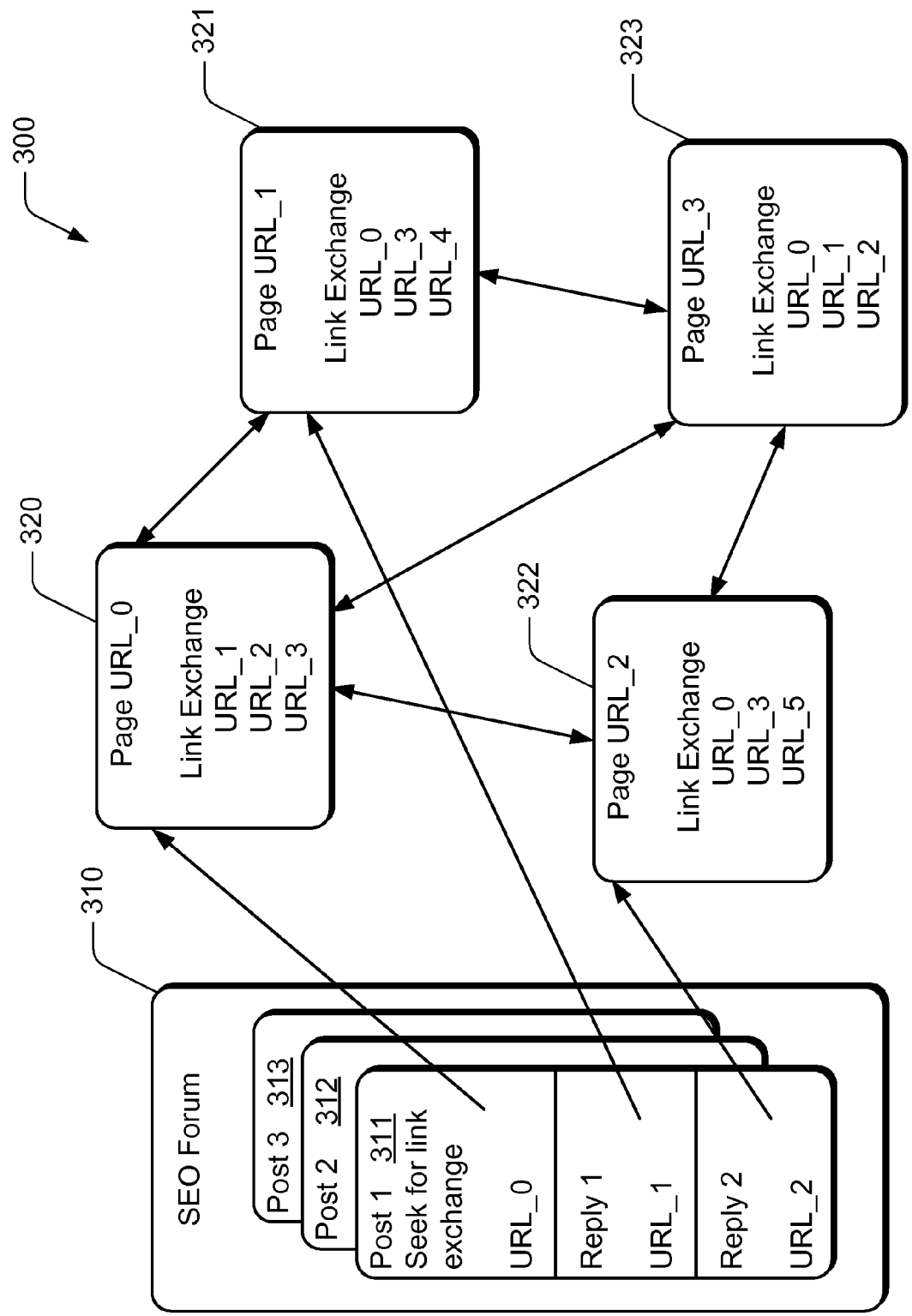
FIG. 3 is an illustration of an exemplary link graph of multiple suspicious spamming URLs showing both explicit spammers and hidden spammers.

FIG. 3 is an illustration of an exemplary link graph of multiple suspicious spamming URLs showing both explicit spammers and hidden spammers. The link graph 300 shows link information of multiple suspicious spamming URLs. The link information originates in SEO forum 310. Multiple posts, Post 1 (311), Post 2 (312) and Post 3 (313), are identified in SEO forum 310 and retrieved to be analyzed. For example, Post 1 (311) seeks for link exchange on behalf of URL_0. In response to Post 1, multiple replies such as Reply 1 and Reply 2 are posted. For example, Reply 1 is posted in response on behalf of URL_1, and Reply 2 is posted on behalf of URL_2.

Identifying the initiating site URL_0 and direct responding sites URL_1 and URL_2 may serve as preliminary evidence that there may be a spamming link exchange between URL_0 and URL_1, and also one between URL_0 and URL_2. Preferably, however, more concrete evidence may be obtained by crawling the initiating site URL_0 and the responding sites URL_1 and URL_2 to detect actual links placed in the site URL_0. As shown in FIG. 3, on webpage URL_0 (320), links from URL_0 to other URLs such as URL_1, URL_2 and URL_3 are found; on webpage URL_1 (321), links from URL_1 to other URLs such as URL_0, URL_3, and URL_4 are found; and on webpage URL_2 (323), links from URL_2 to other URLs such as URL_0, URL_3, and URL_5 are found. It is thus detected that link exchanges exist between URL_0 and URL_1 and between URL_0 and URL_2.

Although a mere existence of mutual links between two websites does not necessarily suggest an illegitimate link exchange, the further evidence that URL_0 is found in an initiating post (Post 1) seeking for link exchange, and that URL_1 and URL_2 are found in responding posts (Reply 1 and Reply 2), strongly supports the conclusion that these links are spammers. Furthermore, because the direct linking relationship, these link exchanges may be identified as explicit spamming links, and the related websites URL_0, URL_1 and URL_2 as explicit spammers.

The situation with webpage URL_3 (323) is slightly different. URL_3 did not appear explicitly in the posts on the SEO forum 310. Nonetheless, URL_3 is detected by propagating from explicit spammers URL_0, URL_1 and URL_2. It is further detected that URL_3 has done link exchanges with at least some of these explicit spammers. The system therefore should have confidence that URL_3 has conducted clandestine link exchanges with explicit spammers, and therefore should be treated as a spammer. URL_3 thus identified is an inexplicit spammers or hidden spammer.

In addition, some spammers want to make indirect link exchanges such as three-way link exchanges rather than direct link exchanges (e.g., bi-direction link-exchanges), as the former are more difficult to be detected. Using the above-described website propagation, such indirect link exchanges may also be detected.

Figure 4:
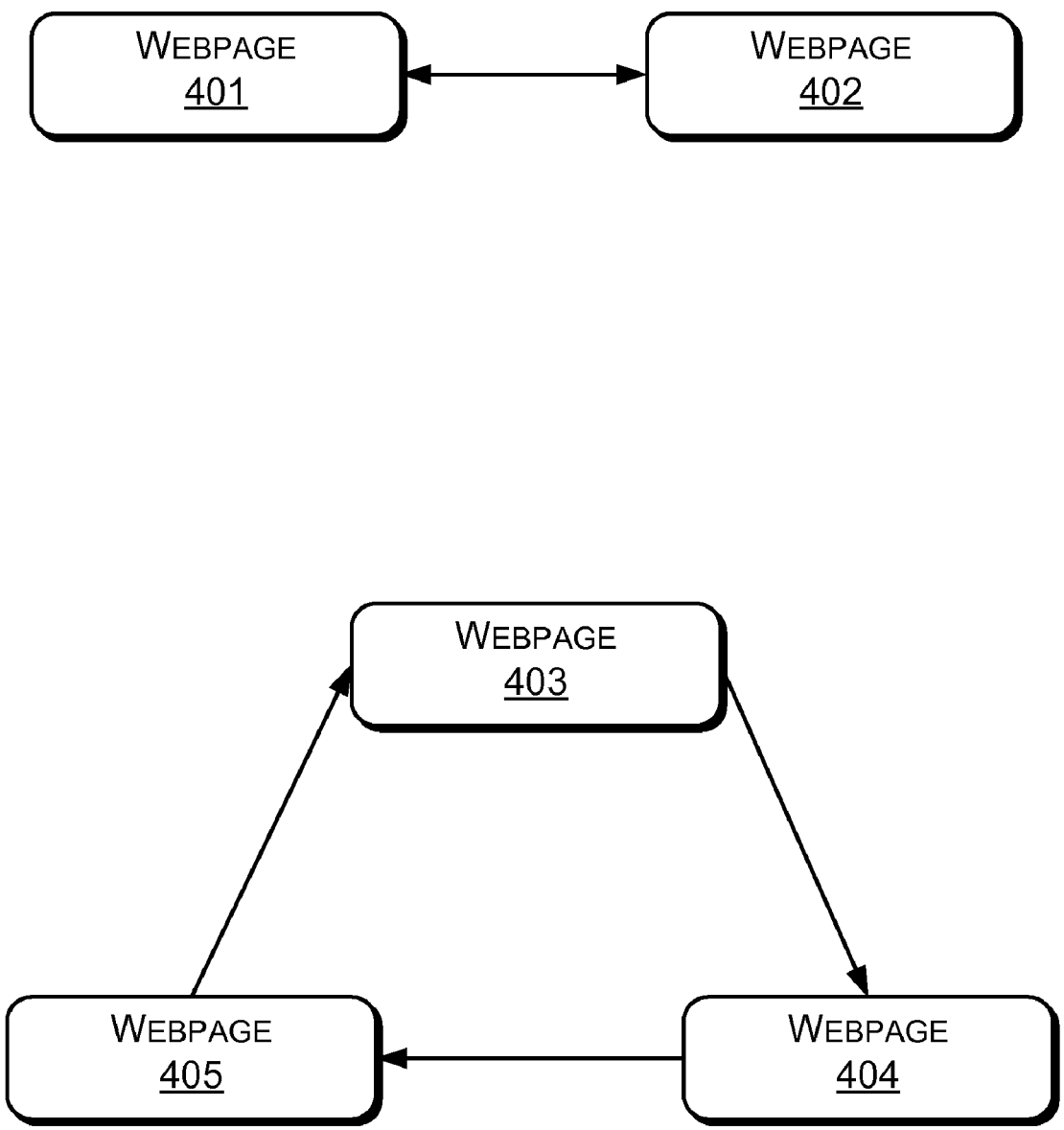
FIG. 4 is an illustration of an exemplary bi-direction link exchange and an exemplary three-way link exchange.

FIG. 4 is an illustration of an exemplary bi-direction link exchange and an exemplary three-way link exchange. Webpage 401 and webpage 402 form a bi-direction link exchange. Specifically, webpage 401 contains a link to webpage 402, while webpage 402 contains a reciprocal link to webpage 401. In contrast, webpages 403, 404 and 405 form a three-way link exchange. Specifically, webpage 403 contains a link to webpage 404, webpage 404 contains a link to another webpage 405 (but does not contain a reciprocal link back to webpage 403), while webpage 405 contains a link to webpage 403 (but does not contain a reciprocal link back to webpage 404). Both bi-direction link exchanges and three-way link exchanges are detectable using the technique described herein, especially by the website propagation.

Furthermore, some URLs are more frequently posted for link-exchange in SEO forums than others, indicating more spamming activity, and likely higher culpability. Therefore, based on the statistical information from forum context and the link graph structure, each detected site can be assigned an "activity score" for their link-exchange degree. Further detail of the activity scoring is described in the following section of the present description.

Exemplary System Architecture

Figure 5:
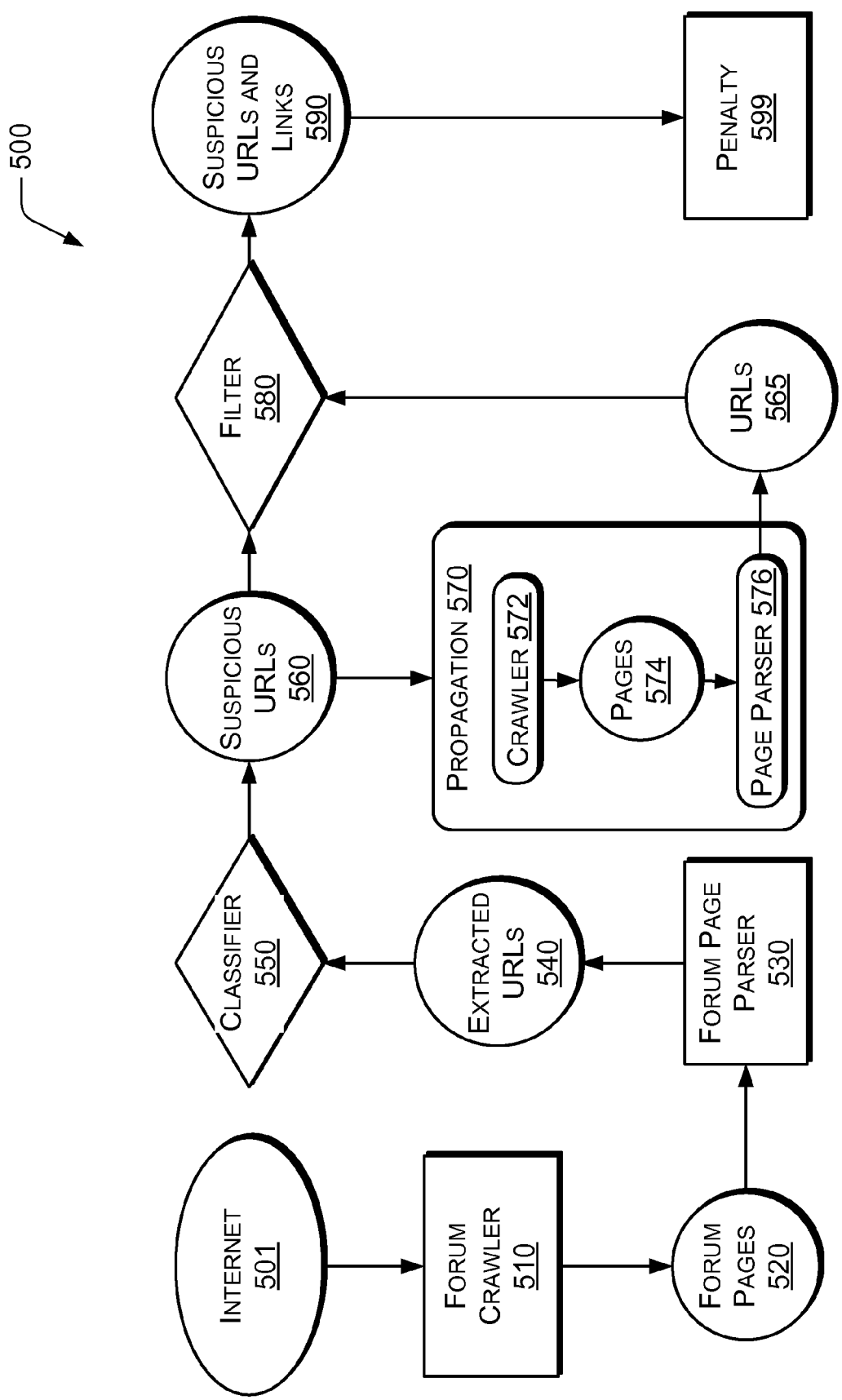
FIG. 5 shows an exemplary system architecture for the SEO spam mining system.

FIG. 5 shows an exemplary system architecture for the SEO spam mining system. The SEO spam mining system 500 utilizes Internet 501, on which the suspect SEO forums are found. The system 500 includes multiple components which are described below.

Forum crawler 510 downloads the threads in the provided SEO forums on the Internet. The list of the SEO forums may be maintained manually. The downloaded threads include forum pages 520.

Forum page parser 530 parses the crawled forum pages 520 to extract URLs 540 from forum pages 520.

Classifier 550 uses a rule-based approach to classify extracted URLs 540 into multiple categories. In one example, extracted URLs 540 are classified into four categories according to the content of the user post and/or reply which contained extracted URL. The content of the user posts and replies may be analyzed based on keywords, key phrases or language patterns. An extracted URL 540 may be found in different posts and replies having different content, and may thus belong to multiple categories. The four exemplary categories include "Link Exchange", "Link Sale", "Recommendation Exchange", and "Others", which are explained as follows.

Link Exchange: To classify a link exchange URL, various schemes and criteria may be used. For example, for each post, if any of the patterns "exchange", "look for +{partner|site|link}", "reciprocal link", "{add|submit}+{link|site}", "backlink", "three way", or "link partner" is found in any line of the post, the URLs found in this post may be considered as spam sites conducting link exchange. In the above exemplary patterns, "+" stands for conjunctive "and", while "|" stands for disjunctive "or". The above exemplary criteria treat each post independently. Other criteria that are more inclusive may also be used. For example, the inclusion may be extended to all the posts by the same user. Specifically, if any post by the same user in a thread contains any of the above patterns, the URLs found in all posts in the same thread by the same user may be considered as spam sites conducting link exchange. The inclusion may also be extended to the entire thread. For example, if the starting post of a thread contains any of the above patterns, all URLs found in the entire thread may be considered as spam sites. The broader the inclusion is, the less likely would a suspicious URL escape penalty, but on the other hand more likely would an innocent URL be incorrectly punished. A balance based on a compromise may be achieved from practice.

Other phrases or language patterns may also be used as markers for a link exchange, and such phrases or language patterns may be learned by experience, and modified or expanded accordingly.

Link Sale: Likewise, various schemes and criteria may be used to classify a link sale URL. In one embodiment, for each post, if an "{ads|link}+buy" pattern or an "{ads|link}+$" pattern is found in any line of the post, the URLs in this post are considered as spam sites. Alternatively, if any post by the same user in a thread contains any of the above patterns, URLs in all posts by the same user in the thread are considered as spam sites. Alternatively, if the starting post of a thread contains any of the above patterns, the URLs in the whole thread may be considered as spam sites.

Recommendation Exchange: Likewise, various schemes and criteria may be used to classify a recommendation exchange URL. For example, if the thread title or the study post contains word: 'stumble', 'delicious' or 'dig', all URLs posted in this thread are considered as spam sites.

Other: All URLs that do not meet the above requirements for classifications are classified into "others".

The above described classifier 550 produces a set of suspicious URLs 560. In one embodiment, suspicious URLs 560 are used as a seed set of suspicious URLs for further propagation in order to acquire additional suspicious URLs. As shown in FIG. 5, propagation 570 may include its own crawler 572 which propagates from the seed set of suspicious URLs 560 to identify additional webpages 574. Page parser 576 parses the additional webpages 574 to produce an additional set of suspicious URLs 565.

Propagation 570 may be performed on URLs which belong to each link category described above, and may be performed for multiple levels, e.g. three levels. In performing the propagation, each link category may be treated either similarly or differently.

The set of suspicious URLs 560 and the additional set of suspicious URLs 565 are combined to construct a directed link graph. Link exchange detection techniques are applied in this step. In one embodiment, all sites performing either bi-direction or three-way link exchanges in the link graph are identified and regarded as suspicious link exchange sites. Some of these sites may be hidden spammers.

Each node in the directed link graph is a domain. The links between pages may be weighted. For example, the weight of a link from page A to page B may be the number of URLs pointed from A to B.

Filter 580 is applied to process URLs in the propagated link graph constructed above to generate a final set of suspicious spam URLs and links 590 for applying penalty 599. Filter 580 may be knowledge-based. For example, a white list may be maintained to remove the good websites in the propagated link graph so as to improve precision.

To further improve the effectiveness of the penalty, activity scores may be calculated for each suspicious URL. The system may assign an activity score to each suspicious spam site identified above. The scores may be calculated based on multiple factors, for example by weighted linear combination of the following factors.

(i) The number of posts of the user who posted the URL.

(ii) The post time sequence of the user who posted the URL.

(iii) The number of different URLs posted by the user who posted the URL.

(iv) The number of following posts (replies) if the URL is the starting post. In general, if there are many posts following the starting post containing a URL, it is an indication that this URL is very attractive for link-exchanges, and thus has more culpability to deserve a heavier penalty.

(v) The number of occurrences of the URL posted in all forums.

(vi) The post time sequence of the URL in all forums.

(vii) The link structure of the whole propagated link graph.

(viii) The relative position of the site in the propagated link graph.

The penalty 599 is applied on the final set of suspicious URLs and the corresponding links 590, conditioned by the activity scores calculated. Usually, the suspicious spam URLs with higher activity scores deserve greater penalty. A threshold may be set such that only suspicious spam URLs with an activity score above the threshold are punished.

Implementation Environment

The above-described techniques may be implemented with the help of a computing device, such as a server, a personal computer (PC) or a portable device having a computing unit.

Figure 6:
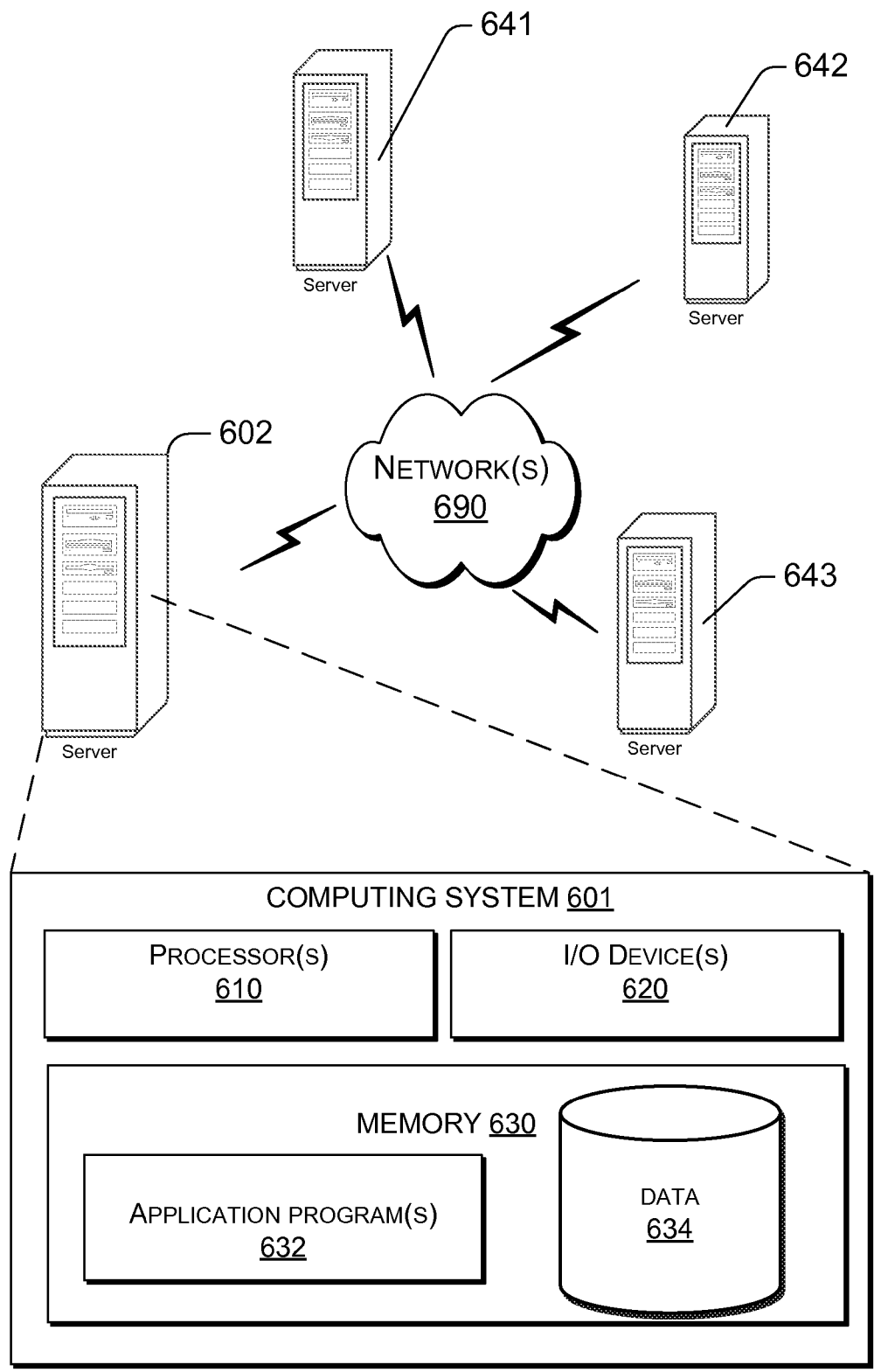
FIG. 6 shows an exemplary environment for implementing the method of the present disclosure.

FIG. 6 shows an exemplary environment for implementing the method of the present disclosure. Computing system 601 is implemented with computing device 602 which includes processor(s) 610, I/O devices 620, computer readable media (e.g., memory) 630, and network interface (not shown). The computer device 602 is connected to servers 641, 642 and 643 through networks 690.

The computer readable media 630 stores application program modules 632 and data 634 (such as link exchange data). Application program modules 632 contain instructions which, when executed by processor(s) 610, cause the processor(s) 610 to perform actions of a process described herein (e.g., the processes of FIGS. 1-2).

For example, in one embodiment, computer readable medium 630 has stored thereupon a plurality of instructions that, when executed by one or more processors 610, causes the processor(s) 610 to:

(i) Collect a plurality of webpages from one or more suspect spam websites;

(ii) Extract suspicious link exchange URLs and corresponding link information from the plurality of webpages; and (iii) Apply a search engine ranking penalty on at least some of the suspicious link exchange URLs. The penalty is at least partially determined by the link information associated with the respective suspicious link exchange URL.

It is appreciated that the computer readable media may be any of the suitable memory devices for storing computer data. Such memory devices include, but not limited to, hard disks, flash memory devices, optical data storages, and floppy disks. Furthermore, the computer readable media containing the computer-executable instructions may consist of component(s) in a local system or components distributed over a network of multiple remote systems. The data of the computer-executable instructions may either be delivered in a tangible physical memory device or transmitted electronically.

It is also appreciated that a computing device may be any device that has a processor, an I/O device and a memory (either an internal memory or an external memory), and is not limited to a personal computer. For example, a computer device may be, without limitation, a server, a PC, a game console, a set top box, and a computing unit built in another electronic device such as a television, a display, a printer or a digital camera.

Especially, the computer device 602 may be a search engine server, or a cluster of such search engine servers.

CONCLUSION

It is appreciated that the potential benefits and advantages discussed herein are not to be construed as a limitation or restriction to the scope of the appended claims.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
under a control of one or more processors configured with computer-executable instructions:
collecting a plurality of webpages from one or more suspect spam websites, the plurality of webpages including one or more posts posted by one or more users for trading links, the one or more posts including a request, a reply, a suggestion, or a recommendation relating to one or more URLs or one or more webpages represented by the one or more URLs respectively, the one or more URLs being distinct from one or more URLs of the one or more suspect spam websites;
detecting one or more keywords or language patterns relating to one or more suspicious link exchange URLs that are distinct from the one or more URLs of the one or more suspect spam websites from contents of the plurality of webpages without visiting one or more websites represented by the one or more suspicious link exchange URLs;
extracting the one or more suspicious link exchange URLs from the one or more URLs;
classifying the one or more suspicious link exchange URLs into a plurality of categories at least partly based on the one or more keywords or language patterns detected in the information, a respective language pattern corresponding to a respective category, the one or more language patterns including a pattern corresponding to a category for link exchange URL, a pattern corresponding to a category for link sale URL, and a pattern corresponding to a category for recommendation exchange URL; and
applying a search engine ranking penalty to at least one of the one or more suspicious link exchange URLs, the penalty being at least partially determined by link information associated with the at least one suspicious link exchange URL.

2. The method as recited in claim 1, wherein the one or more suspect spam websites include a list of pre-identified search engine optimization forums.

3. The method as recited in claim 1, wherein collecting the plurality of webpages comprises crawling the one or more suspect spam websites using a web crawler.

4. The method as recited in claim 1, wherein collecting the plurality of webpages comprises:
identifying a thread of user posts on one or more search engine optimization forums contained in the one or more suspect spam websites; and
downloading the identified thread of posts.

5. The method as recited in claim 1, wherein extracting suspicious link exchange URLs and corresponding link information is carried out using a webpage parser.

6. The method as recited in claim 1, further comprising:
applying a predetermined filter to the extracted one or more suspicious link exchange URLs to clear some of the extracted one or more suspicious link exchange URLs.

7. The method as recited in claim 6, wherein the predetermined filter includes a white list.

8. The method as recited in claim 1, wherein the extracting suspicious link exchange URLs comprises:
extracting a seed set of at least one of the one or more suspicious link exchange URLs; and
propagating from the seed set of suspicious link exchange URLs to detect and collect additional suspicious link exchange URLs.

9. The method as recited in claim 1, further comprising:
extracting the link information associated with the at least one suspicious link exchange URL from the plurality of webpages.

10. The method as recited in claim 9, further comprising:
constructing a link graph of the at least one suspicious link exchange URL using the extracted link information; and
detecting one or more link exchanges by analyzing the link graph's structure.

11. The method as recited in claim 10, wherein the one or more link exchanges include explicit spammers and hidden spammers.

12. The method as recited in claim 10, wherein the link exchanges include bi-direction link exchanges and three-way link exchanges.

13. The method as recited in claim 1, wherein each suspicious link exchange URL is evaluated by a spam activity score which is calculated by a weighted linear combination of multiple activity factors.

14. The method as recited in claim 1, wherein the search engine penalty is applied to a respective suspicious link exchange URL that has a spam activity score higher than a preset threshold value.

15. One or more computer readable media having stored thereupon a plurality of computer-executable instructions that, when executed by one or more processors, cause the one or more processors to perform actions comprising:

collecting a plurality of webpages from one or more suspect spam websites, the plurality of webpages including one or more posts posted by one or more users for trading links, the one or more posts including a request, a reply, a suggestion, or a recommendation relating to one or more URLs or one or more webpages represented by the one or more URLs respectively, the one or more URLs being distinct from one or more URLs of the one or more suspect spam websites;

detecting one or more keywords or language patterns relating to one or more suspicious link exchange URLs that are distinct from the one or more URLs of the one or more suspect spam websites from contents of the plurality of webpages without visiting one or more websites represented by the one or more suspicious link exchange URLs;

extracting the one or more suspicious link exchange URLs from the one or more URLs;

classifying the one or more suspicious link exchange URLs into a plurality of categories at least partly based on the one or more keywords or language patterns detected in the post request and the reply, a respective language pattern corresponding to a respective category, the one or more language patterns including a pattern corresponding to a category for link exchange URL, a pattern corresponding to a category for link sale URL, and a pattern corresponding to a category for recommendation exchange URL; and applying a search engine ranking penalty to at least one of the one or more suspicious link exchange URLs, the penalty being at least partially determined by link information associated with the at least one suspicious link exchange URL.

16. The one or more computer readable media as recited in claim 15, wherein the pattern corresponding to a category for link exchange URL including any of following language patterns found in any line of a respective webpage:

"exchange";
"look for +{partner|site|link}";
"reciprocal link";
"{add|submit}+{link|site}";
"backlink";
"three way"; or
"link partner",
wherein:
"+" stands for conjunctive and; and
"|" stands for disjunctive or.

17. The one or more computer readable media as recited in claim 15, wherein the actions further comprise extracting the link information associated with the at least one suspicious link exchange URL from the plurality of webpages.

18. A system comprising:
one or more processors; and
one or more computer readable media having stored thereon computer-executable components that are executable by the one or more processor to perform actions comprising:

collecting a plurality of webpages from one or more suspect spam websites, the plurality of webpages including one or more posts posted by one or more users for trading links, the one or more posts including a request, a reply, a suggestion, or a recommendation relating to one or more URLs or one or more webpages represented by the one or more URLs respectively, the one or more URLs being distinct from one or more URLs of the one or more suspect spam websites;

detecting one or more keywords or language patterns relating to one or more suspicious link exchange URLs that are distinct from the one or more URLs of the one or more suspect spam websites from contents of the plurality of webpages without visiting one or more websites represented by the one or more suspicious link exchange URLs;

extracting the one or more suspicious link exchange URLs from the one or more URLs;

classifying the one or more suspicious link exchange URLs into a plurality of categories at least partly based on the one or more keywords or language patterns detected in the post request and the reply, a respective language pattern corresponding to a respective category, the one or more language patterns including a pattern corresponding to a category for link exchange URL, a pattern corresponding to a category for link sale URL, and a pattern corresponding to a category for recommendation exchange URL; and applying a search engine ranking penalty to at least one of the one or more suspicious link exchange URLs, the penalty being at least partially determined by link information associated with the at least one suspicious link exchange URL.

19. The system as recited in claim 18, further comprising propagating from a respective suspicious link exchange URL from the one or more suspicious link exchange URLs to detect additional suspicious link exchange URLs;

constructing a link graph of the respective suspicious link exchange URL;

detecting one or more link exchange activities by analyzing the link graph's structure; and calculating a spam activity score of the respective suspicious link exchange URL according to the one or more detected link exchange activities.

20. The system as recited in claim 18, further comprising extracting the link information associated with the at least one suspicious link exchange URL from the plurality of webpages.

* * * * *